United States Patent
Ran et al.

(10) Patent No.: US 10,169,027 B2
(45) Date of Patent: Jan. 1, 2019

(54) UPGRADE OF AN OPERATING SYSTEM OF A VIRTUAL MACHINE

(71) Applicant: International Business Machines Corporation, Armonk, NY (US)

(72) Inventors: Chuan Ran, Cary, NC (US); Jian Qiu Wang, Beijing (CN); Yang Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 239 days.

(21) Appl. No.: 15/147,364

(22) Filed: May 5, 2016

(65) Prior Publication Data

US 2017/0322793 A1  Nov. 9, 2017

(51) Int. Cl.
*G06F 9/445* (2018.01)
*G06F 9/455* (2018.01)
*G06F 8/65* (2018.01)

(52) U.S. Cl.
CPC ............ *G06F 8/65* (2013.01); *G06F 9/45558* (2013.01); *G06F 2009/45562* (2013.01)

(58) Field of Classification Search
CPC .................... G06F 8/65; G06F 2009/45562
See application file for complete search history.

(56) References Cited

U.S. PATENT DOCUMENTS

| | | | | |
|---|---|---|---|---|
| 9,588,793 | B2* | 3/2017 | Warszawski | ........ G06F 9/45558 |
| 2009/0313620 | A1* | 12/2009 | Sedukhin | .................. G06F 8/61 |
| | | | | 718/1 |
| 2011/0107331 | A1* | 5/2011 | Evans | .................. H04W 4/003 |
| | | | | 718/1 |
| 2012/0005236 | A1* | 1/2012 | Deng | ........................ G06F 8/10 |
| | | | | 707/798 |
| 2012/0005678 | A1* | 1/2012 | Ge | ........................ G06F 9/4856 |
| | | | | 718/1 |
| 2012/0158920 | A1* | 6/2012 | Yang | ........................ G06F 8/61 |
| | | | | 709/220 |
| 2013/0167148 | A1* | 6/2013 | Lee | ..................... G06F 9/45558 |
| | | | | 718/1 |
| 2014/0189685 | A1 | 7/2014 | Kripalani | |
| 2015/0177997 | A1 | 6/2015 | Warszawski et al. | |
| 2016/0283162 | A1* | 9/2016 | Inagaki | ................. G06F 3/0652 |
| 2016/0283261 | A1* | 9/2016 | Nakatsu | ............. G06F 9/45558 |
| 2017/0139727 | A1* | 5/2017 | Combellas | ................ G06F 8/65 |

* cited by examiner

*Primary Examiner* — Wei Y Zhen
*Assistant Examiner* — Brahim Bourzik
(74) *Attorney, Agent, or Firm* — Schmeiser, Olsen & Watts, LLP; Isaac Gooshaw

(57) ABSTRACT

A method, and associated computer system and computer program product. One or more processors of a computer system receive an upgrade request to upgrade a base operating system (OS) of a virtual machine (VM). In response to receiving the upgrade request, the one or more processors store metadata of the VM into a resource registry. The one or more processors load a new version of the base OS onto the VM. The one or more processors retrieve, from the resource registry, the stored metadata for configuring the VM.

9 Claims, 5 Drawing Sheets

UPGRADE OF AN OPERATING SYSTEM OF A VIRTUAL MACHINE

TECHNICAL FIELD

The present invention relates to upgrading an operating system (OS) of a virtual machine (VM).

BACKGROUND

As known, a virtual machine (VM) is a software implementation or emulation of a machine (for example, a computer) that executes programs like a physical machine. For example, a VM may provide a complete system platform which supports execution of an operating system (OS) which may be referred to as "base OS."

After a VM is deployed, it is sometimes necessary to upgrade the base OS of the VM.

Conventionally, this upgrading of the base OS of the VM can be done by duplicating data of the VM itself, deleting the VM, creating a new VM with a new OS image, and then copying the duplicated data of the VM itself back to the newly created VM.

The preceding conventional process needs considerable resources such as network resources, storage resources, and the like. Resource consumption will be further increased if deletion of the VM does not immediately release all the resources allocated to the VM due to system maintenance or billing policy. For those environments like cloud platforms including a great number of VMs, such conventional upgrade of an OS image will significantly degrade system performance. Moreover, the failure of the VM OS upgrade would be very dangerous and even bring down the entire system if VMs for key components of the system cannot be correctly recreated.

SUMMARY

The present invention provides a method, and an associated computer system and computer program product. One or more processors of a computer system receive an upgrade request to upgrade a base operating system (OS) of a virtual machine (VM). In response to receiving the upgrade request, the one or more processors store metadata of the VM into a resource registry. The one or more processors load a new version of the base OS onto the VM. The one or more processors retrieve, from the resource registry, the stored metadata for configuring the VM.

It is to be understood that the Summary is not intended to identify key or essential features of embodiments of the present invention, nor is it intended to be used to limit the scope of the present invention. Other features of the present invention will become easily comprehensible through the description below.

BRIEF DESCRIPTION OF THE DRAWINGS

Through the more detailed description of some embodiments of the present invention in the accompanying drawings, the above and other embodiments, features and advantages of the present invention will become more apparent.

Throughout the drawings, the same or similar reference numerals represent the same or similar elements.

DETAILED DESCRIPTION

Example embodiments of the present invention provide a method, a computer system, a device, and a computer program product for upgrading an operating system (OS) of a virtual machine (VM).

Principle of the present invention will now be described with reference to some example embodiments. It is to be understood that these embodiments are described only for the purpose of illustration and help those skilled in the art to understand and implement the present invention, without suggesting any limitations as to the scope of the present invention. The present invention described herein can be implemented in various manners other than the ones describe below.

Figure 1:
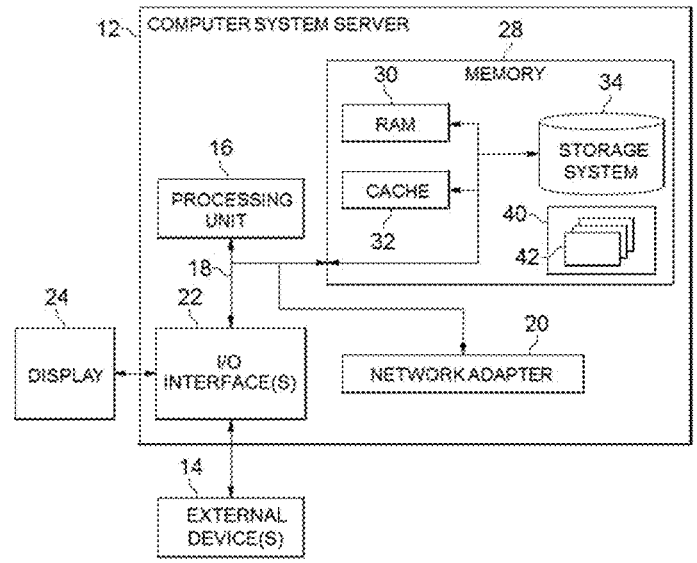
FIG. 1 is a block diagram of an exemplary electronic device or computer system/server suitable for implementing embodiments of the present invention.

Reference is first made to FIG. 1, in which an exemplary electronic device or computer system/server 12 which is applicable to implement the embodiments of the present invention is shown. Computer system/server 12 is only illustrative and is not intended to suggest any limitation as to the scope of use or functionality of embodiments of the present invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to the one or more processors or processing units 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. The scope of "media" includes computer readable media and computer readable hardware storage devices (e.g., storage system 34). Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each medium and storage device can be connected to bus 18 by one or more data media interfaces. As will be further depicted and described below, memory 28 may include at least one program product having a set (e.g., at least one) of program modules that are configured to carry out the functions of embodiments of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the present invention as described herein. Computer system/server 12 may also communicate with one or more external devices 14 such as a keyboard, a pointing device, a display 24, and the like. Computer system/server 12 may also communicate with one or more devices that enable a user to interact with computer system/server 12; and/or any devices (e.g., network card, modem, etc.) that enable computer system/server 12 to communicate with one or more other computing devices. Such communication can occur via input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, and the like.

In computer system/server 12, I/O interfaces 22 may support one or more of various different input devices that can be used to provide input to computer system/server 12. For example, the input device(s) may include a user device such keyboard, keypad, touch pad, trackball, and the like. The input device(s) may implement one or more natural user interface techniques, such as speech recognition, touch and stylus recognition, recognition of gestures in contact with the input device(s) and adjacent to the input device(s), recognition of air gestures, head and eye tracking, voice and speech recognition, sensing user brain activity, and machine intelligence.

Example embodiments of the present invention will be described. As mentioned above, conventional ways for upgrading the base OS of a VM involve deleting the original VM and then creating a new VM with the upgraded version of OS. This process will consume considerable resources and might cause fatal errors of the whole platform. According to embodiments of the present invention, instead of deleting the VM, metadata of the VM is stored into a resource registry. Then the new version of the OS of the VM is loaded, for example, by use of functions provided by the infrastructure. The metadata of the VM that includes a specific value to indicate the type of action is retrieved, and the specific value in the metadata is used to collaborate with a pattern matcher 308 (see FIG. 3) to i) decide if the type of action is an upgrade action, and ii) if the type of action is an upgrade action, to configure the VM with the new version of OS to complete the OS upgrade.

Figure 2:
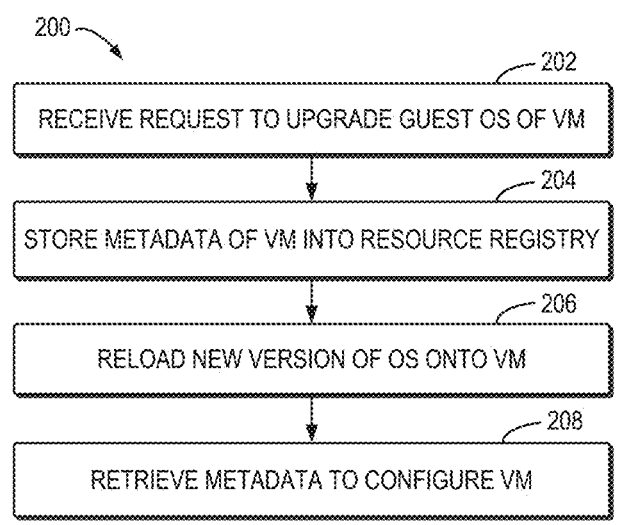
FIG. 2 is a flowchart of an exemplary method for upgrading a virtual machine (VM) operating system (OS), in accordance with embodiments of the present invention.

FIG. 2 shows a flowchart of an exemplary method 200 for upgrading a base OS of a VM in accordance with embodiments of the present invention. In step 202, an upgrade request to upgrade the base OS of the VM is received. In one embodiment, the upgrade request is an express request dedicated to the upgrade of VM OS. Alternatively, in another embodiment, a request for another purpose such as a VM deletion request may be regarded as the upgrade request if some condition is met, as will be described in the following paragraphs.

In response to the upgrade request, in step 204, metadata of the VM will be stored into a resource registry (e.g., within the computer system/server of FIG. 1). The metadata indicates one or more aspects of the VM. Examples of the metadata include, but are not limited to, a unique identifier of the VM, a network address such as an Internet Protocol (IP) address of the VM, a host name of the VM, or one or more important services on the VM. In some embodiments, the resource registry is hosted or otherwise associated with an infrastructure in which the VM is deployed. For example, in embodiments where the VM is deployed in a PAAS (Platform as a Service), the resource registry may be a cloud storage hosted by the PAAS. The resource registry can be implemented on any other suitable storage as well. In some embodiments, the metadata of the VM can be stored in form of database tables, for example. In such embodiments, the identifier of the VM may serve as a primary key by which the metadata can be retrieved later. Example embodiments will be described below.

Next the method 200 proceeds to step 206, where a new version of OS is loaded onto the VM. That is, in accordance with embodiments of the present invention, the base OS is upgraded by loading the new version of the OS to the same VM rather than by: deleting the current VM and creating the new VM. As a result, efficiency of the OS upgrade can be significantly improved while reducing resource consumption. In some embodiments, in step 206, a function(s) provided by the infrastructure may be used to load the OS. Still considering the example embodiments where the VM is deployed in the PAAS, the IAAS (Infrastructure as a Service) provides an application programming interface (API) function for loading the base OS of VM. In such embodiments, the API function can be invoked to load the OS.

In step 208, the metadata of the VM, which is stored into the resource registry in step 204, is retrieved from the resource registry. As described above, in some embodiments, the identifier of the VM may be used as a primary key to query the resource registry to obtain the metadata. The metadata will be used to configure the VM whose OS has been updated. For example, the host name, IP address, and/or one or more services of the VM can be configured based on the retrieved metadata. In this way, services and settings of the VM can be quickly restored.

It is to be understood that although step 206 is shown prior to step 208, this is merely for the purpose of illustration without suggesting any limitation as to the scope of the present invention. In some embodiments, the metadata can be retrieved before the new version of the OS is loaded. Specifically, in some embodiments, steps 206 and 208 can be carried out in parallel. That is, it is possible to use a single instruction to load the new version of the OS and configure the VM with the metadata.

Figure 3:
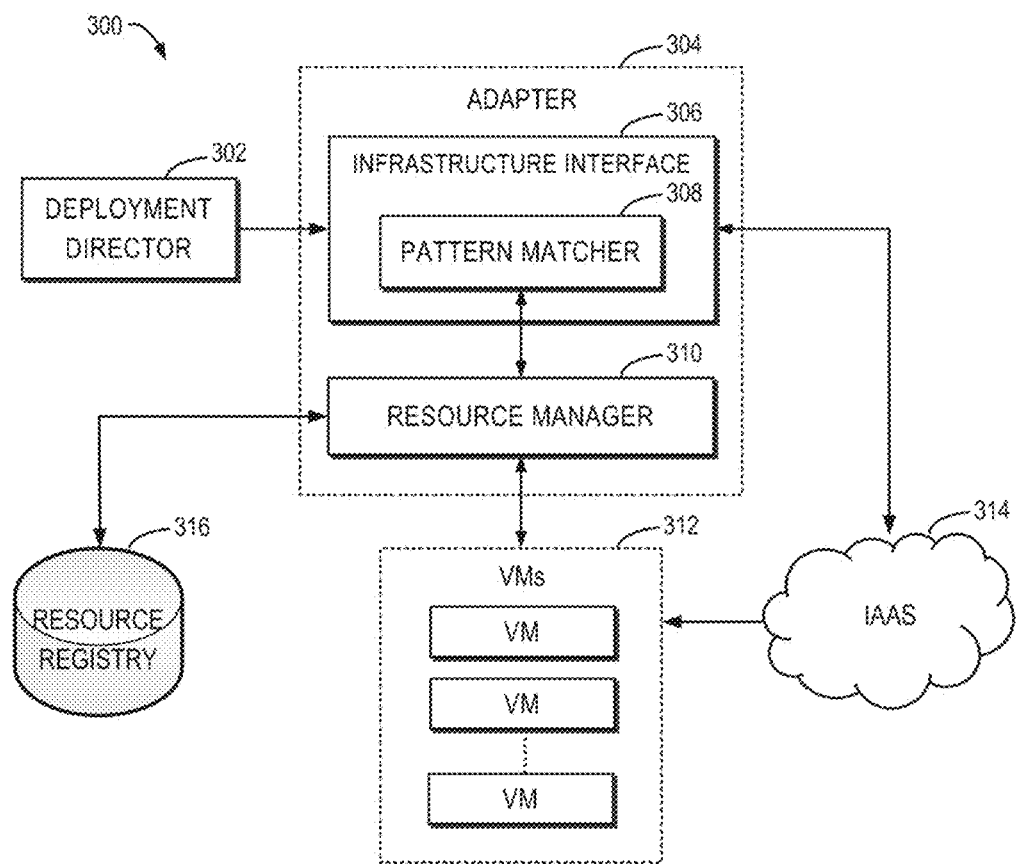
FIG. 3 is a block diagram of a system or platform for upgrading a VM OS, in accordance with embodiments of the present invention.

FIG. 3 shows a block diagram of a system or platform 300 for upgrading the VM OS, in accordance with embodiments of the present invention. VMs may be deployed in a PAAS. As shown, the system or platform 300 includes a deployment director 302, an adapter 304, a resource registry 316, an IAAS 314 and one or more VMs 312. The deployment director 302 controls the deployment of the VMs 312 in the platform 300. For example, the deployment director 302 may issue requests or instructions for creating and/or deleting one or more VMs 302. The IAAS 314 is an online service that alleviates users of the platform 300 from the detail of infrastructure like physical computing resources, location, data partitioning, scaling, security, backup, and/or the like. For example, the IAAS 314 may provide underlying APIs to manipulate the VMs 312.

The adapter 304 and the resource registry 316 work together to implement the upgrade of the VM OS, in accordance with embodiments of the present invention. The adapter 304 includes an infrastructure interface 306 which is capable of communicating with the deployment director 302 and the IAAS 314. The infrastructure interface 306 includes at least a pattern matcher 308 which can work with a resource manager 310 included in the adapter 304, as shown in FIG. 3. In this embodiment, in order to achieve increased compatibility, the deployment director 302 is allowed to, but is not required to, operate in a conventional way in one embodiment. More specifically, when the base OS of a VM 312 is to be upgraded, the deployment director 302 may first issue a VM deletion request and then send a VM creation request. Different from the conventional OS upgrade processes, within each of the VM deletion and creation requests, a special flag will be set to allow the pattern matcher 308 to determine the real intention of the VM deletion request.

The VM deletion request and the VM creation request, issued by the deployment director 302, are received and analyzed by the pattern matcher 308. If the flags are detected, then the pattern matcher 308 will interpret the VM deletion request and the VM creation request as OS upgrade requests. At this point, the pattern matcher 308 will trigger implementation of the method 200 as described above. That is, instead of actually deleting and creating the VM 312, the pattern matcher 308 controls the resource manager 310 to store and retrieve metadata to and from the resource registry 316. The pattern matcher 308 further works with the IAAS 314 to load the new version of the OS of the VM 312 and use the metadata to configure the VM 312 with the new version of the OS. Detailed operations are shown in FIGS. 4A and 4B.

Figure 4A:
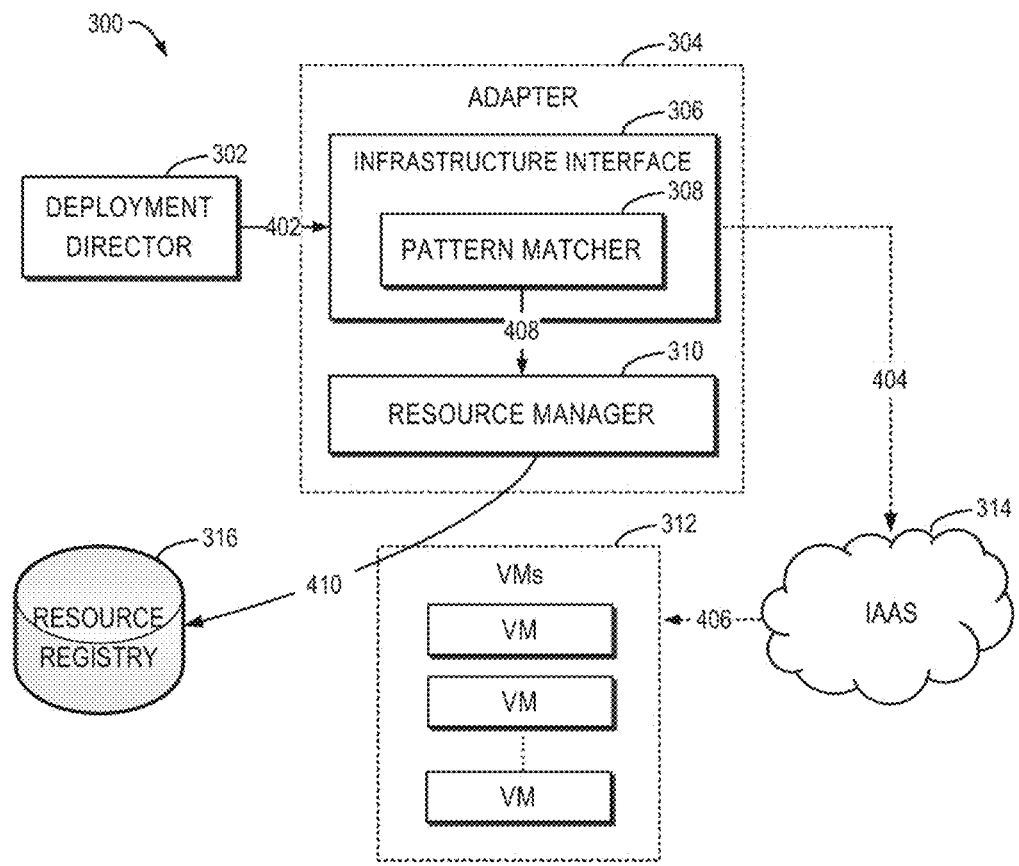
FIGS. 4A and 4B shows message flows in upgrading a VM OS, in accordance with embodiments of the present invention.
Figure 4B:
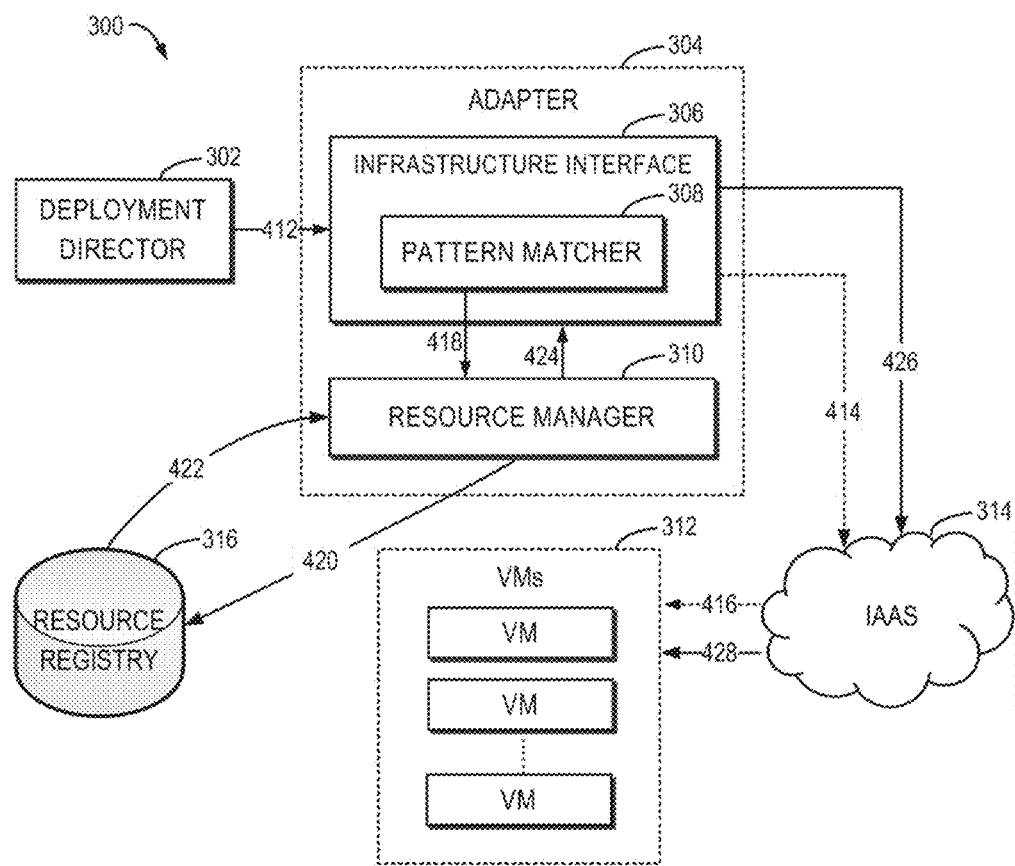

FIG. 4A shows a part of message flows in the system or platform 300 for an OS upgrade, in accordance with embodiments of the present invention. As described above, the deployment director 302 issues a VM deletion request when a base OS of a VM 312 is to be upgraded. In this embodiment, if it is determined that the base OS is to be upgraded instead of actually deleting the VM 312, then deployment director 302 may set a flag in the request. For the sake of discussion, the flag in the VM deletion request may be herein referred to as a "first flag." In some embodiments, the first flag may be a unique identifier or code that is defined in advance and can be used by the pattern matcher 308 to decide whether the VM deletion request constitutes a request to upgrade the base OS of a VM 312. It is also possible to use a two-valued variable as the first flag, such as a Boolean variable which can be set to "TRUE" or "FALSE" or an integer variable which can be set to "1" or "0," for example. Other implementations are feasible as well.

The pattern matcher 308 of the infrastructure interface 304 receives (402) the VM deletion request issued by the deployment director 302. The VM deletion request may specify the target VM 312 by including a unique identifier of the VM 312, for example. If the pattern matcher 308 finds that the received VM deletion request does not include the first flag or the first flag is not set, then it is determined that this VM deletion request is a normal deletion request. In this case, the infrastructure interface 304 calls (404) the IAAS 314 to delete the target VM 312. In one embodiment, the IAAS deletes (406) the VM 312, for example, by means of an API function. How to delete the VM is known and will not be discussed herein.

On the other hand, if the pattern matcher 308 determines that the VM deletion request received from the deployment director 302 includes the first flag indicating that the request is actually intended to upgrade the base OS of the VM 312, then the pattern matcher 308 sends (408) to the resource manager 310 a request to store the metadata of the target VM 312. Upon receipt of the request, the resource manager 310 obtains and stores (410) the metadata of the target VM 312 into the resource registry 316. As described above, the metadata of the target VM 312 can be stored as one or more entries in a database table and the unique identifier of the VM 312 may serve as the primary key.

FIG. 4B shows another part of message flows in the system or platform 300 for the OS upgrade, in accordance with embodiments of the present invention. In order to complete the OS upgrade, the deployment director 302 issues (412) a VM creation request after sending (402) the VM deletion request. For the OS upgrade process, the deployment director 302 will set a flag in the VM creation request. For sake of discussion, this flag included in the VM creation request may be herein referred to as a "second flag." Similar to the first flag in the VM deletion request, the second flag may be a unique identifier or code, a Boolean value, an integer value, or the like. The first and second flags may or may not be the same flag.

Upon determining that the second flag is not included or set in the received VM creation request, the pattern matcher 308 calls (414) the IAAS 314 which in turn creates (416) a new VM 312. Creation of a VM is known and thus will not be discussed in detail herein.

On the other hand, if the VM creation request includes the second flag which has been set to indicate that the request is intended to upgrade the base OS of the VM 312, then the pattern matcher 308 sends (418) a request to the resource manager 310 for retrieving the metadata of the VM 312 from the resource registry 316. In this VM creation request, the pattern matcher 308 may include the identifier of the target VM 312, for example. The resource manager 310 uses the identifier of the VM 312 as the primary key to query (420) the resource registry 316 for the metadata. Upon receipt (422) of the metadata, the resource manager 310 provides (424) the metadata to the infrastructure interface 306. The infrastructure interface 306 calls (426) the IAAS 314 to load the new version of the base OS of the VM 312. The metadata is sent to the IAAS 314. The IAAS 314 invokes (428) one or more related API functions to load the new version of the VM OS and configure the VM 312 with the metadata. In this way, the upgrade of the base OS of the VM 312 is completed.

Figure 5:
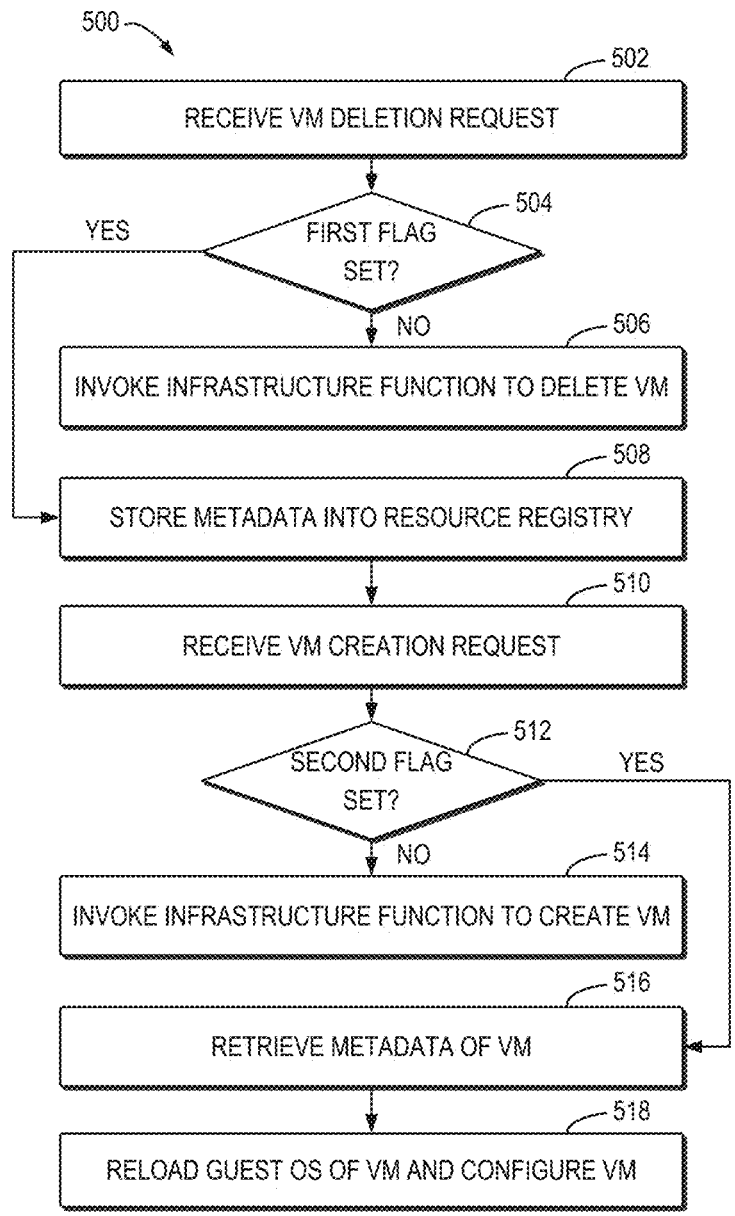
FIG. 5 is a flowchart of a method for upgrading VM OS, in accordance with embodiments of the present invention.

FIG. 5 shows a flowchart of a method 500 for upgrading the VM OS, in accordance with embodiments of the present invention. The method 500 can be considered as an example implementation of the method 200 as described above with reference to FIG. 2 and can be carried out by the adapter 304 as shown in FIGS. 3, 4A and 4B.

In step 502, a VM deletion request is received, for example, from the deployment director 302. In step 504, it is determined whether the VM deletion request includes the first flag which has been set to indicate that the request is intended to upgrade the base OS of a VM 312. If not (NO branch from step 504), the method 500 proceeds to step 506 to invoke functions provided by the infrastructure such as the IAAS 314 to actually delete the VM 312. Otherwise (YES branch from step 504), the method 500 proceeds to step 508, where the metadata of the VM 312 is obtained and stored into the resource registry 316.

In step 510, a VM creation request is received. In step 512, it is determined whether the VM creation request includes the second flag which has been set to indicate that the request is intended to upgrade the base OS of the VM 312. The first and second flags may or may not be the same, as described above. If not (NO branch from step 512), the method 500 proceeds to step 514 to invoke functions provided by the infrastructure such as the IAAS 314 to actually create a new VM 312. Otherwise (YES branch from step 512), the method 500 proceeds to step 516, where the metadata of the VM 312 is retrieved from the resource registry 316. In step 518, one or more functions (for example, API functions) provided by the infrastructure may be invoked to load the new version of the base OS of the VM 312 and use the retrieved metadata to configure the VM 312 with the new version of OS.

It would be appreciated that embodiments of the present invention avoid resource freeze issues limited by an infrastructure provider and prevent upgrade failure and the error or outage of the whole platform or system. Moreover, traditional OS upgrade, by deletion of the original VMs and creation of the new VMs, typically requires twice the number of VMs when compared to some embodiments of the present invention. By reusing existing resources, the cost is significantly reduced with the present invention. Additionally, the time cost for upgrading the OS image can be reduced, since it takes less time to load the new version of base OS of an existing VM than to delete the original VM and then create a new VM. Load of the infrastructure of the IAAS is decreased as well.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises one or more computer readable hardware storage devices having computer readable program code stored therein, said program code containing instructions executable by one or more processors to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    receiving, by one or more processors of a computer system, a virtual machine (VM) deletion request, wherein if the VM deletion request includes a first flag then the VM deletion request is a request to upgrade a base operating system (OS) of the VM, and wherein if the VM deletion request does not include the first flag then the VM deletion request is a request to delete the VM;
    said one or more processors determining whether the received VM deletion request includes the first flag;
    in response to the one or more processors determining that the received VM deletion request includes the first flag, said one or more processors storing metadata of the VM into a resource registry;
    after said storing the metadata of the VM into the resource registry, said one or more processors receiving a VM creation request, wherein if the VM creation request includes a second flag then the VM deletion request is a request to upgrade the base OS of the VM, and wherein if the VM creation request does not include the second flag then the VM creation request is a request to create a new VM;
    said one or more processors determining whether the received VM deletion request includes the second flag;
    in response to the one or more processors determining that the received VM creation request includes the second flag, said one or more processors retrieving the metadata from the resource registry;
    after said retrieving the metadata from the resource registry, said one or more processors loading a new version of the base OS onto the VM and using the retrieved metadata to configure the VM with the new version of the base OS; and
    said one or more processors deploying the VM with the new version of the base OS.

2. The method of claim 1, wherein the metadata is selected from the group consisting of an identifier of the VM, a network address of the VM, a host name of the VM, one or more services on the VM, and combinations thereof.

3. A computer system, comprising one or more processors, one or more memories, and one or more computer readable hardware storage devices, said one or more hardware storage device containing program code executable by the one or more processors via the one or more memories to implement a method, said method comprising:
    receiving, by the one or more processors, a virtual machine (VM) deletion request, wherein if the VM deletion request includes a first flag then the VM deletion request is a request to upgrade a base operating system (OS) of the VM, and wherein if the VM deletion request does not include the first flag then the VM deletion request is a request to delete the VM;
    said one or more processors determining whether the received VM deletion request includes the first flag;
    in response to the one or more processors determining that the received VM deletion request includes the first flag, said one or more processors storing metadata of the VM into a resource registry;
    after said storing the metadata of the VM into the resource registry, said one or more processors receiving a VM creation request, wherein if the VM creation request includes a second flag then the VM deletion request is a request to upgrade the base OS of the VM, and wherein if the VM creation request does not include the second flag then the VM creation request is a request to create a new VM;
    said one or more processors determining whether the received VM deletion request includes the second flag;
    in response to the one or more processors determining that the received VM creation request includes the second flag, said one or more processors retrieving the metadata from the resource registry;

after said retrieving the metadata from the resource registry, said one or more processors loading a new version of the base OS onto the VM and using the retrieved metadata to configure the VM with the new version of the base OS; and said one or more processors deploying the VM with the new version of the base OS.

4. The computer system of claim 3, wherein the metadata is selected from the group consisting of an identifier of the VM, a network address of the VM, a host name of the VM, one or more services on the VM, and combinations thereof.

5. A computer program product, comprising one or more computer readable hardware storage devices having computer readable program code stored therein, said program code containing instructions executable by one or more processors of a computer system to implement a method, said method comprising:

receiving, by the one or more processors, a virtual machine (VM) deletion request, wherein if the VM deletion request includes a first flag then the VM deletion request is a request to upgrade a base operating system (OS) of the VM, and wherein if the VM deletion request does not include the first flag then the VM deletion request is a request to delete the VM;

said one or more processors determining whether the received VM deletion request includes the first flag;

in response to the one or more processors determining that the received VM deletion request includes the first flag, said one or more processors storing metadata of the VM into a resource registry;

after said storing the metadata of the VM into the resource registry, said one or more processors receiving a VM creation request, wherein if the VM creation request includes a second flag then the VM deletion request is a request to upgrade the base OS of the VM, and wherein if the VM creation request does not include the second flag then the VM creation request is a request to create a new VM;

said one or more processors determining whether the received VM deletion request includes the second flag;

in response to the one or more processors determining that the received VM creation request includes the second flag, said one or more processors retrieving the metadata from the resource registry;

after said retrieving the metadata from the resource registry, said one or more processors loading a new version of the base OS onto the VM and using the retrieved metadata to configure the VM with the new version of the base OS; and said one or more processors deploying the VM with the new version of the base OS.

6. The computer program product of claim 5, wherein the metadata is selected from the group consisting of an identifier of the VM, a network address of the VM, a host name of the VM, one or more services on the VM, and combinations thereof.

7. The method of claim 1, wherein said deploying the VM comprises deploying the VM in a Platform as a Service (PAAS), and wherein the resource registry is cloud storage hosted by the PAAS.

8. The computer system of claim 3, wherein said deploying the VM comprises deploying the VM in a Platform as a Service (PAAS), and wherein the resource registry is cloud storage hosted by the PAAS.

9. The computer program product of claim 5, wherein said deploying the VM comprises deploying the VM in a Platform as a Service (PAAS), and wherein the resource registry is cloud storage hosted by the PAAS.

* * * * *